United States Patent
Osumi et al.

(10) Patent No.: US 7,557,698 B2
(45) Date of Patent: *Jul. 7, 2009

(54) WHEEL INFORMATION PROCESSING DEVICE

(75) Inventors: Ryota Osumi, Toyota (JP); Atsushi Ogawa, Dusseldorf (DE)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 255 days.

This patent is subject to a terminal disclaimer.

(21) Appl. No.: 11/333,267

(22) Filed: Jan. 18, 2006

(65) Prior Publication Data

US 2006/0176164 A1    Aug. 10, 2006

(30) Foreign Application Priority Data

Jan. 26, 2005    (JP)    ............... 2005-018885

(51) Int. Cl.
*B60C 23/00*    (2006.01)

(52) U.S. Cl. .................. 340/442; 340/445; 73/146; 116/34 R

(58) Field of Classification Search ......... 340/442–449, 340/686.1, 686.6, 539.1, 45; 73/146; 116/34 A, 116/34 B, 34 R, 34 C; 152/152.1
See application file for complete search history.

(56) References Cited

U.S. PATENT DOCUMENTS

| | | | |
|---|---|---|---|
| 6,486,773 B1 | 11/2002 | Bailie et al. | |
| 6,501,372 B2 | 12/2002 | Lin | |
| 6,580,364 B1 | 6/2003 | Munch et al. | |
| 6,897,770 B2 | 5/2005 | Lill | |
| 6,954,688 B2 | 10/2005 | Katou | |
| 7,095,316 B2 | 8/2006 | Kachouh et al. | |
| 7,104,438 B2 | 9/2006 | Benedict | |
| 2003/0020605 A1* | 1/2003 | Starkey | 340/447 |
| 2004/0201466 A1* | 10/2004 | Ikeda et al. | 340/442 |
| 2004/0217854 A1* | 11/2004 | Hirohama et al. | 340/445 |
| 2005/0045257 A1* | 3/2005 | Kogure et al. | 152/152.1 |
| 2007/0080795 A1* | 4/2007 | Ichikawa et al. | 340/447 |

FOREIGN PATENT DOCUMENTS

| | | |
|---|---|---|
| JP | U 05-013802 | 2/1993 |
| JP | A 09-280320 | 10/1997 |
| JP | A 11-240315 | 9/1999 |
| JP | A 2003-25817 | 1/2003 |
| JP | A 2003-518281 | 6/2003 |
| JP | A 2005-100100 | 4/2005 |
| WO | WO 01/45967 A1 | 6/2001 |

* cited by examiner

*Primary Examiner*—Daniel Wu
*Assistant Examiner*—Hongmin Fan
(74) *Attorney, Agent, or Firm*—Oliff & Berridge, PLC

(57) ABSTRACT

A wheel information processing device comprises a plurality of wheel-side communication units provided in a wheel of an automotive vehicle, and a body-side communication unit provided in a body of the vehicle to communicate with the plurality of wheel-side communication units. A pattern of transmission of signals transmitted by the plurality of wheel-side communication units respectively is determined based on a characteristic of the wheel-side communication unit concerned.

12 Claims, 11 Drawing Sheets

FIG.4

| #1 | #2 | #3 | #4 | #5 |
|---|---|---|---|---|
| 3 | 5 | 5 | 5 | 1 |
| 1 BYTE | 1 BYTE | 1 BYTE | 1 BYTE | 1 BYTE |

DATA CODE OF CALL SIGNAL

FIG.5

| RUNNING STATE | CALL SIGNAL | | | | |
|---|---|---|---|---|---|
| | #1 | #2 | #3 | #4 | #5 |
| JUST AFTER IGNITION KEY ON | 3 | 5 | 5 | 5 | 1 |
| STRAIGHT-AHEAD (LOW SPEED) | 3 | 10 | 10 | 10 | 5 |
| STRAIGHT-AHEAD (HIGH SPEED) | 2 | 10 | 10 | 10 | 2 |
| CORNERING | 1 | 10 | 10 | 10 | 3 |
| SUDDEN AIR-PRESSURE DROP | 3 | 10 | 10 | 10 | 1 |
| VEHICLE STOP | 10 | 10 | 10 | 10 | 2 |

152, 154, 156, 150

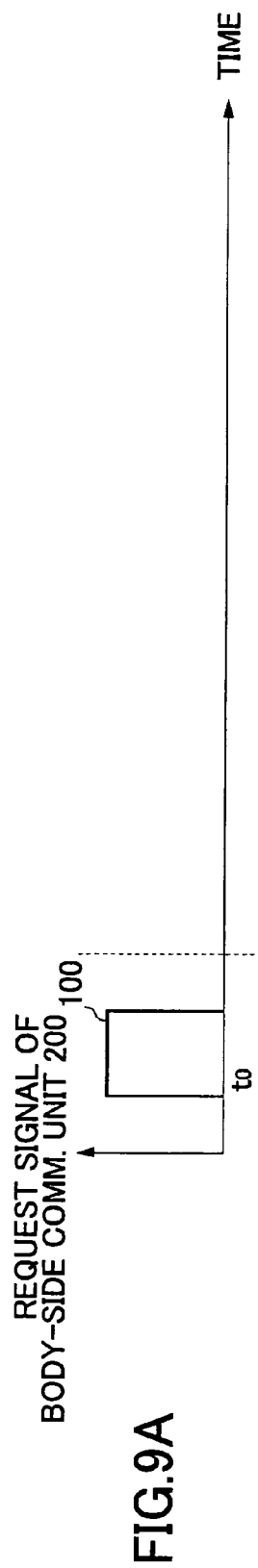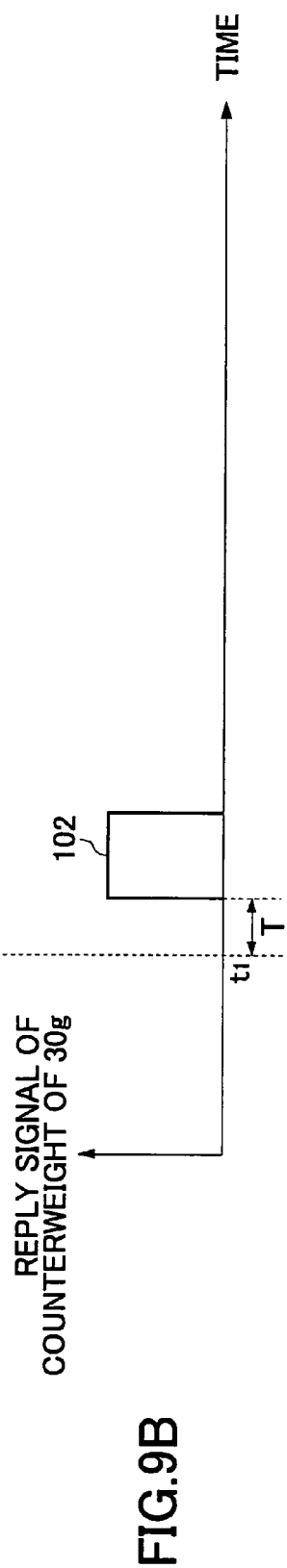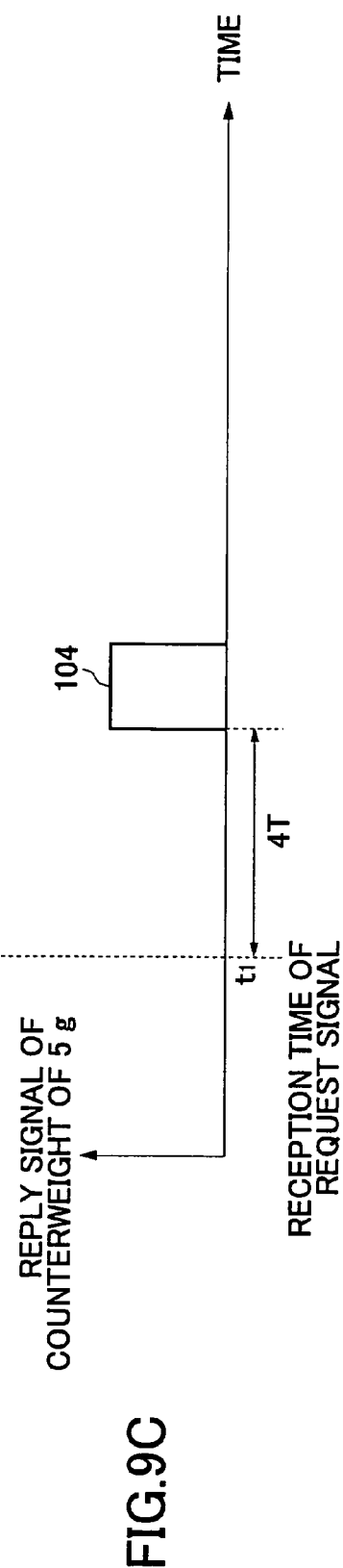

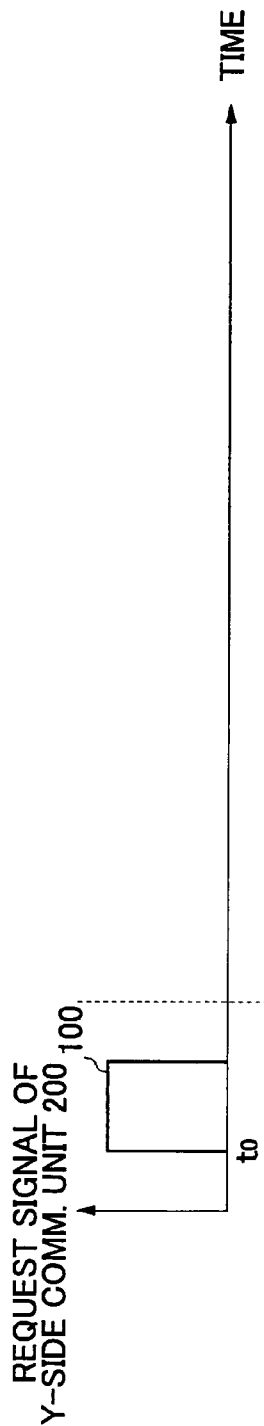
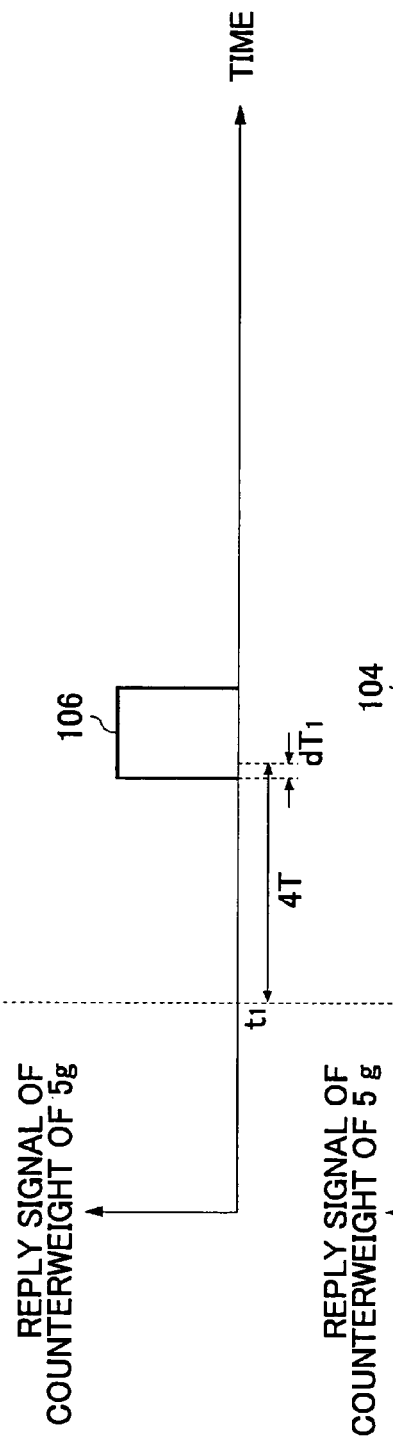
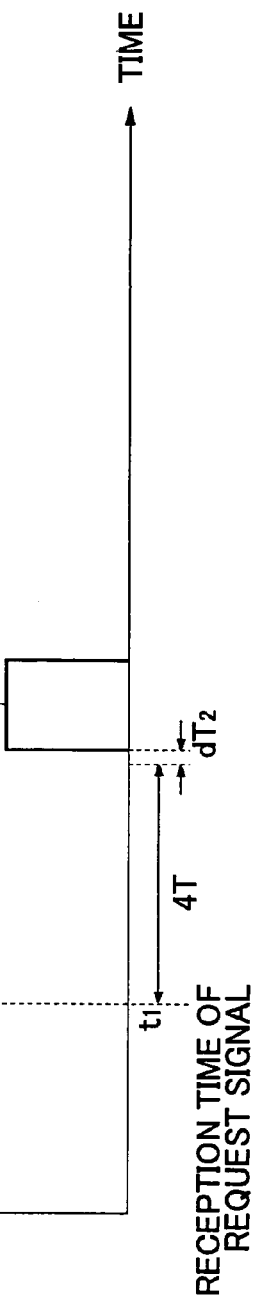

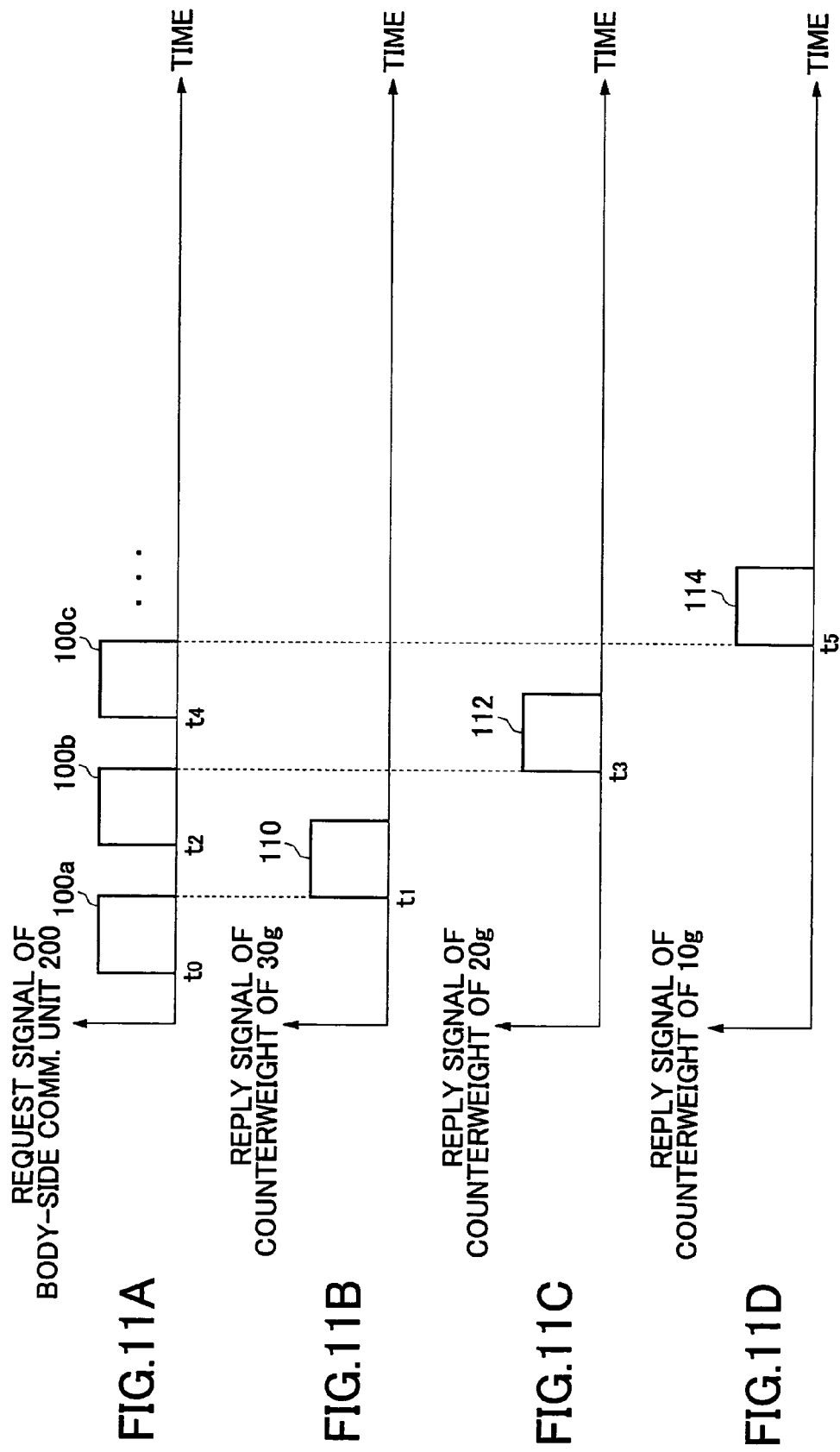

WHEEL INFORMATION PROCESSING DEVICE

BACKGROUND OF THE INVENTION

1. Field of the Invention

The present invention relates to a wheel information processing device which processes wheel information for use in an automotive vehicle.

2. Description of the Related Art

To attain safe running of an automotive vehicle, it is indispensable to keep the state of the wheels normal. If the vehicle continuously runs with the tires in a low-pressure state or high-temperature state over a long period of time, the reliability of the tires will be spoiled. In some cases, an undesired phenomenon may occur on the tires.

Therefore, it is desirable that the air pressure and temperature states of the respective tires be monitored appropriately, and detection of a fault in the tires be notified to a driver of the vehicle at an early stage.

Japanese Laid-Open Utility Model Application No. 05-013802 discloses a tire pressure alarm system which is equipped with a wheel-side transmitter which transmits tire pressure information, and a body-side receiver which receives the tire pressure information from the wheel side transmitter.

In order to grasp the state of the wheels, the wheel information must include the sensor information of various sensors, such as air pressure sensors and temperature sensors. To detect the temperature of the wheels, the sensor information must be collected from the sensors at different positions on the tires, the wheels, etc.

There is a case in which the level of priority of some of the sensor information varies depending on the running state of the vehicle. It is desirable that the body-side communication unit communicates with the wheel-side communication unit by taking into consideration this point.

The prerequisite for the alarm system disclosed in Japanese Laid-Open Utility Model Application No. 05-013802 is that a single wheel-side communication unit be disposed in each of the wheels of the vehicle. If two or more wheel-side communication units are disposed in each wheel, the problem of interference between the wheel-side communication units may arise.

For this reason, in a case in which a plurality of sensors are disposed in one wheel and a plurality of communication units which transmit the outputs of the sensors are also disposed in the wheel, it is desirable that the body-side communication unit receives the wheel information while the interference between the plurality of wheel-side communication units is avoided, and the wheel information is processed.

SUMMARY OF THE INVENTION

An object of the present invention is to provide an improved wheel information processing device in which the above-mentioned problems are eliminated.

Another object of the present invention is to provide a wheel information processing device which is capable of acquiring preferentially the necessary wheel information from the plurality of wheel-side communication units exactly.

In order to achieve the above-mentioned objects, the present invention provides a wheel information processing device comprising: a plurality of wheel-side communication units provided in a wheel of an automotive vehicle; and a body-side communication unit provided in a body of the vehicle to communicate with the plurality of wheel-side communication units, wherein a pattern of transmission of signals transmitted by the plurality of wheel-side communication units respectively is determined based on a characteristic of the wheel-side communication unit concerned.

The pattern of transmission of the signals transmitted by the plurality of wheel-side communication units respectively may include a frequency of transmission of a transmitting signal, a probability of transmission of a transmitting signal, and a time of transmission of a transmitting signal. The characteristic of the wheel-side communication unit may include the characteristic of the wheel-side communication unit itself, such as the contents of wheel information included in a transmitting signal transmitted by the wheel-side communication unit concerned, and an arrangement location of the wheel-side communication unit concerned.

According to an embodiment of the invention, the body-side communication unit can acquire preferentially the necessary wheel information from the plurality of wheel-side communication units by changing, for example, a frequency of transmission of a transmitting signal based on the characteristic of the wheel-side communication unit.

The above-mentioned wheel information processing device of the invention may be configured so that the pattern of transmission of the signals transmitted by the plurality of wheel-side communication units respectively is determined based on either an element that determines a necessity of transmission of a signal transmitted by the wheel-side communication unit concerned or an element that determines a communication performance of the wheel-side communication unit concerned.

The necessity of transmission of the signal may be set to a high level as the demand for acquisition of the wheel information at the body-side communication unit is large. The element that determines the necessity of transmission of the signal may be, for example, the contents of wheel information included in the transmitting signal. In this case, the body-side communication unit can acquire preferentially the necessary wheel information from the plurality of wheel-side communication units by raising the frequency of transmission of the transmitting signal concerned according to the level of the acquisition demand or the necessity of transmission by the body-side communication unit. The communication performance of the wheel-side communication unit may be a communication-related capability of the communication unit, such as communication stability.

The above-mentioned wheel information processing device of the invention may be configured to further comprise a wheel information detecting part provided to detect wheel information of the wheel, so that the element that determines the necessity of transmission is a content of the wheel information detected by the wheel information detecting part.

In this case, the body-side communication unit can acquire preferentially the necessary wheel information from the plurality of wheel-side communication units because the frequency of transmission of a transmitting signal which includes wheel information for which the acquisition request by the body-side communication unit is large is raised.

The above-mentioned wheel information processing device of the invention may be configured to further comprise a vehicle running state acquisition part provided to acquire a current running state of the vehicle serially, wherein the pattern of transmission of the signals transmitted by the plurality of wheel-side communication units respectively is determined so that the determined pattern of transmission varies according to a change of the running state of the vehicle acquired by the vehicle running state acquisition part.

In this case, the body-side communication unit can acquire appropriately the wheel information needed according to the running state of the vehicle by changing the frequency of transmission of a transmitting signal of the wheel-side communication unit according to the running state of the vehicle.

The above-mentioned wheel information processing device of the invention may be configured so that a frequency of transmission per a predetermined unit time is determined and thereby the pattern of transmission of the signals transmitted by the plurality of wheel-side communication units respectively is determined. The above-mentioned wheel information processing device of the invention may be configured so that a probability of transmission is determined and thereby the pattern of transmission of the signals transmitted by the plurality of wheel-side communication units respectively is determined. For example, the frequency of transmission or the probability of transmission of a transmitting signal including wheel information for which the acquisition request of the body-side communication unit is large may be made high. In this case, the body-side communication unit can acquire the necessary wheel information preferentially.

The above-mentioned wheel information processing device of the invention may be configured so that the plurality of wheel-side communication units have respective identification numbers that are distinctly separate, each of the plurality of wheel-side communication units receiving a request signal from the body-side communication unit, and the request signal containing a necessity value of reply associated with an identification number of the wheel-side communication unit concerned, and wherein the pattern of transmission of the signals transmitted by the plurality of wheel-side communication units respectively is determined based on the necessity value of reply corresponding to the identification number of the wheel-side communication unit concerned contained in the received request signal.

In this case, the pattern of transmission of the transmitting signal of each of the plurality of wheel-side communication units is changed according to a necessity value of reply corresponding to the identification number of the self unit. For example, the frequency of transmission of the transmitting signal can be raised when the necessity value of reply is high, and the body-side communication unit can acquire preferentially the necessary wheel information from the plurality of wheel-side communication units.

The above-mentioned wheel information processing device of the invention may be configured so that the plurality of wheel-side communication units are provided in a plurality of counterweights respectively, and the pattern of transmission of the signals transmitted by the plurality of wheel-side communication units respectively is determined based on a weight of a counterweight of the wheel-side communication unit concerned. In this case, the pattern of transmission of a transmitting signal of each of the plurality of wheel-side communication units is changed according to the weight of the counterweight. Interference of the transmitting signals can be prevented and the body-side communication unit can acquire exactly the wheel information from the plurality of wheel-side communication units.

The above-mentioned wheel information processing device of the invention may be configured so that a delay time to a time of reception of a request signal of the body-side communication unit is set up for each of the plurality of wheel-side communication units according to the weight of the counterweight of the wheel-side communication unit concerned, and wherein the pattern of transmission of the signals transmitted by the plurality of wheel-side communication units respectively is determined by increasing or decreasing the delay time by a random time that is adequately small when compared with the delay time.

In this case, the pattern of transmission of a transmitting signal of each of the plurality of wheel-side communication units can be changed by adjusting the delay time by the adequately small random time according to the weight of the counterweight. As a result, interference of the transmitting signals can be prevented and the body-side communication unit can acquire exactly the wheel information from the plurality of wheel-side communication units.

The above-mentioned wheel information processing device of the invention may be configured so that the plurality of wheel-side communication units are provided with a plurality of counterweights respectively and have weight information indicating a weight of a counterweight concerned, respectively, the body-side communication unit is provided to transmit a request signal including the weight information to the plurality of wheel-side communication units serially, and each of the plurality of wheel-side communication units is provided to transmit a signal to the body-side communication unit when the weight information included in the request signal received is the same as the weight information of the wheel-side communication unit concerned.

In this case, each of the plurality of wheel-side communication units transmits a transmitting signal when the weight information included in the received request signal is the same as the weight information of the wheel-side communication unit concerned. As a result, the pattern of transmissions of the transmitting signal concerned is changed according to the weight of the counterweight. Therefore, interference of the transmitting signals can be prevented and the body-side communication unit can acquire exactly the wheel information from the plurality of wheel-side communication units.

The above-mentioned wheel information processing device of the invention may be configured so that the element that determines the communication performance of the wheel-side communication unit concerned is an arrangement location of the wheel-side communication unit concerned. The above-mentioned wheel information processing device of the invention may be configured so that the pattern of transmission of the signals transmitted by the plurality of wheel-side communication units respectively is determined such that a frequency of transmission per a predetermined unit time is made high according to a distance of the arrangement location of the wheel-side communication unit concerned from a revolving shaft of the wheel.

Generally, the change of the distance between the wheel-side communication unit and the body-side communication unit becomes large according to the distance of the wheel-side communication unit from the wheel revolving shaft. The communication is not stabilized and the body-side communication unit may fail to receive a reply signal or may receive erroneous information if the reception of the reply signal is performed. Therefore, the body-side communication unit can acquire the necessary wheel information from the plurality of wheel-side communication units exactly by determining the pattern of transmission of a transmitting signal such that a frequency of transmission per a predetermined unit time is made high according to the distance of the arrangement location of the wheel-side communication unit from the revolving shaft of the wheel which shaft is the center of rotation of the wheel.

According to the wheel information processing device of the invention, it is possible for the body-side communication unit to acquire the necessary wheel information preferentially, and it is possible for the body-side communication unit to acquire the necessary wheel information exactly.

BRIEF DESCRIPTION OF THE DRAWINGS

Other objects, features and advantages of the present invention will become apparent from the following detailed description when read in conjunction with the accompanying drawings.

FIG. 4 is a diagram showing an example of the data structure of call signals included in a request signal to the wheel-side communication unit in this embodiment.

FIG. 5 is a diagram showing an example of a call-signal table which is set up according to the running state of the vehicle in this embodiment.

FIG. 9A, FIG. 9B and FIG. 9C are diagrams for explaining the procedure in which the plurality of communication units transmit at different times reply signals to a request signal of the body-side communication unit in this embodiment.

FIG. 10A, FIG. 10B and FIG. 10C are diagrams for explaining the procedure in which the plurality of communication units transmit at different times reply signals to a request signal of the body-side communication unit in this embodiment.

FIG. 11A, FIG. 11B, FIG. 11C and FIG. 11D are diagrams for explaining the procedure in which the plurality of communication units transmit at different times reply signals to a request signal of the body-side communication unit of the wheel information processing device in another embodiment of the invention.

DETAILED DESCRIPTION OF PREFERRED EMBODIMENTS

A description will now be given of an embodiment of the present invention with reference to the accompanying drawings.

Figure 1:
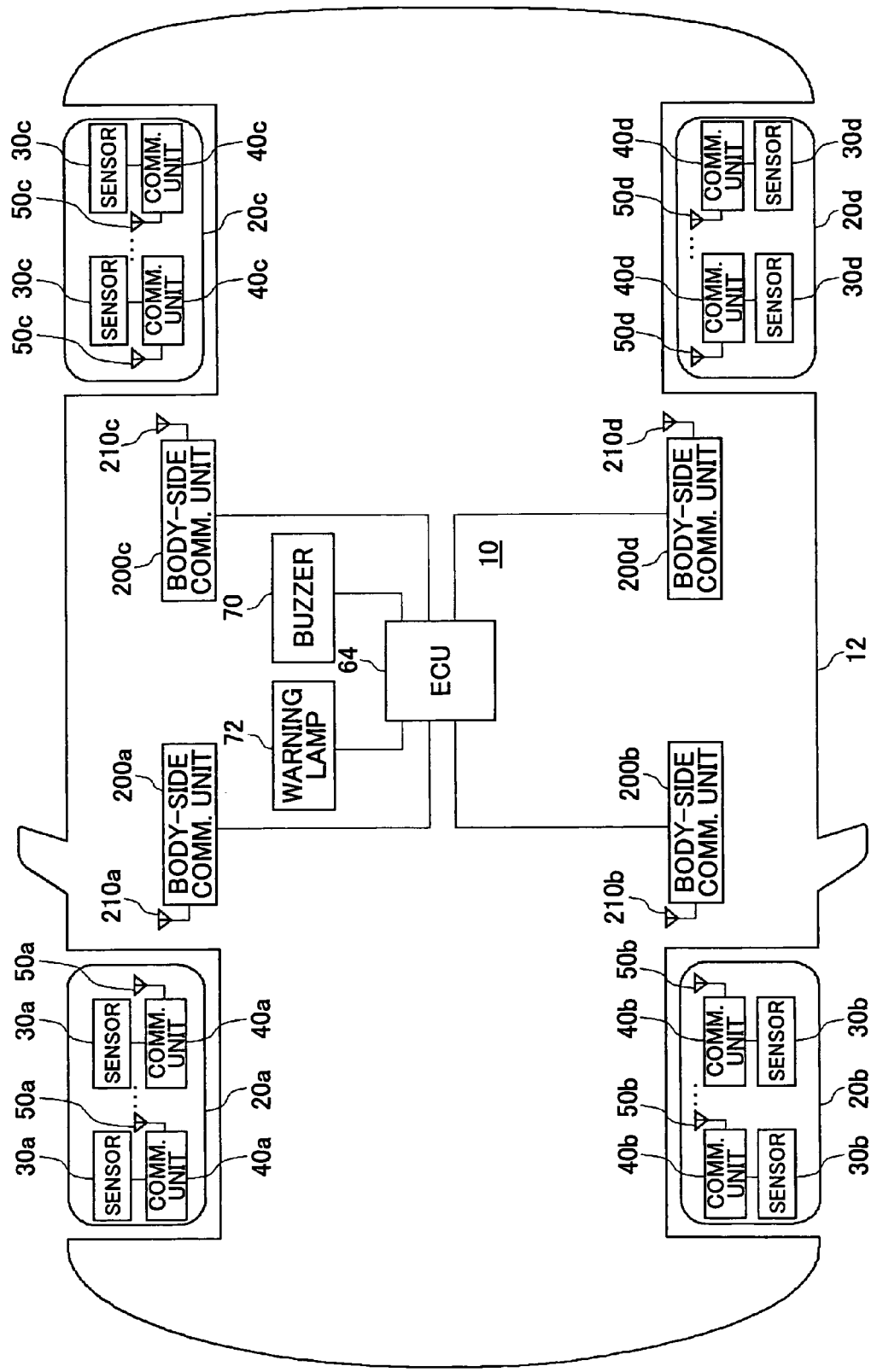
FIG. 1 is a diagram showing the composition of an automotive vehicle in which the wheel information processing device in an embodiment of the invention is provided.

FIG. 1 shows the composition of an automotive vehicle in which a wheel information processing device in an embodiment of the invention is provided. This wheel information processing device includes wheel-side communication units and body-side communication units.

The vehicle 10 is equipped with four wheels 20a-20d and a body 12. Provided in the wheels 20a-20d are sensors 30a-30d which detect respective quantities of wheel state of the wheels 20a-20d, wheel-side communication units 40a-40d which transmit the information on the detected quantities of wheel state (wheel information) to the body 12, and communication antennas 50a-50d. Each of the sensors 30a-30d may be composed of a plurality of sensors. In that case, the plurality of sensors function as a sensor group.

Provided in the body 12 are body-side communication units 200a-200d which receive from the wheels 20a-20d the wheel information respectively, communication antennas 210a-210d, an electronic control unit (ECU) 64 which controls the entire vehicle 10, a buzzer 70, and a warning lamp 72.

In the following, when describing the composition without distinguishing each of the wheels of the vehicle, subscript letters a-d which identify the wheels of the vehicle will be omitted.

The wheel information processing device may be configured to include the sensor 30 and the ECU 64 in addition to the wheel-side communication unit 40 and the body-side communication unit 200.

The plurality of sensors 30 are provided in each of the wheels 20, and the output value of each sensor 30 is sent to the communication unit 40. The communication unit 40 transmits the sensor-output wheel information to the body-side communication unit 200 via the antenna 50 by radio. The communication unit 40 and the antenna 50 may be built in the sensor 30.

The body-side communication unit 200 receives the wheel information from the communication unit 40 via the antenna 210 which is disposed near the wheel 20, and sends the received wheel information to the ECU 64 so that the wheel information is processed by the ECU 64.

The body side communication unit 200 is provided to transmit a request signal to each of the plurality of communication units 40 serially, and requests the transmission of the detection values of its sensors, rather than choosing one of the plurality of communication units 40 and transmitting a request signal to the selected communication unit.

The request signal is a signal for requesting each of the wheel-side communication units 40 to transmit the wheel information.

In the following, a transmitting signal which is transmitted by each of the plurality of wheel-side communication units 40 in response to the request signal from the body-side communication unit 200 is called a reply signal.

The ECU 64 analyzes the wheel information received from the body-side communication unit 200, and grasps the state of the wheel 20 or the state of the vehicle 10.

The ECU 64 notifies the driver of a fault of the wheel 20 by turning on the warning lamp 72 or making a beep sound of the buzzer 70 when the tire temperature of the wheel 20 exceeds a predetermined temperature, or when the tire air pressure of the wheel 20 is less than a predetermined value.

The ECU 64 contains a memory (not illustrated) which stores the loading positions of the plurality of communication units 40 disposed in each of the wheels 20, the identification information of each communication unit 40, and the call-signal table which will be described later.

The identification information of each communication unit 40 is the information for identifying the communication unit 40. The identification information is, for example, the identification number for identifying the communication unit 40 uniquely.

There is a one-to-one correspondence between the communication units 40 and the sensors 30. If a communication unit 40 is specified by the identification information of the communication unit 40, a corresponding sensor 30 is also specified by the same identification information.

The ECU 64 in this embodiment acquires the present running state of the vehicle 10 serially. Alternatively, a vehicle running state acquisition part (not illustrated) which is configured within the ECU 64 may perform the acquisition operation concerned.

Specifically, the vehicle running state acquisition part determines the current running state of the vehicle 10 by referring to the information outputted from a steering angle sensor, a wheel speed sensor, and a braking pressure sensor which are not illustrated.

The running state of the vehicle 10 means the operating state of the vehicle 10 during a period of time between the instant the ignition key is turned on and the instant the ignition key is turned off. Therefore, the operating state of the vehicle 10 immediately after the ignition key is turned on and the operating state of the vehicle 10 during a stop are also included in the running state of the vehicle.

The ECU 64 generates a request signal according to the current running state of the vehicle 10 based on the running state of the vehicle 10 that is determined by referring to the call signal table stored in the above-mentioned memory.

Figure 2:
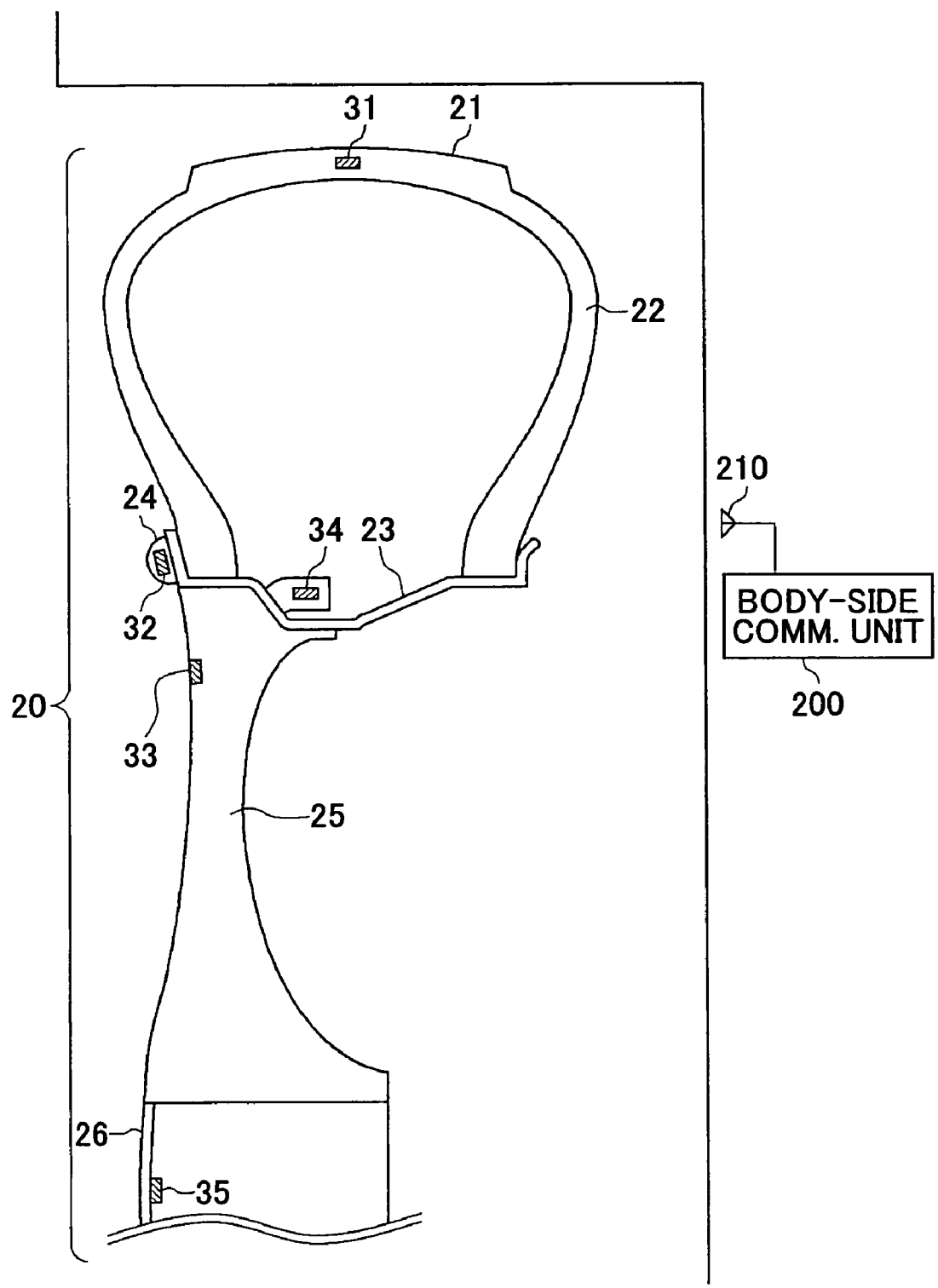
FIG. 2 is a diagram showing the positions where the plurality sensors are disposed in the tire of the vehicle in this embodiment.

FIG. 2 is a diagram showing the positions where the plurality of sensors are disposed in the tire of each wheel in the embodiment of FIG. 1.

Actually, the communication units 40 and the antennas 50 are connected to the plurality of sensors 30 respectively. However, for the sake of simplicity of description, the connecting relation is not illustrated in FIG. 2.

In this embodiment, the wheel 20 includes the tire 22, the rim 23, the wheel 25 and the center cap 26, and the sensors 30 are disposed at five parts of the wheel 20 in FIG. 2.

In the embodiment of FIG. 1, the tire side sensor, the weight side sensor, etc. are unified and designated by the same reference numeral 30. However, in the following embodiment, the sensors are designated by different numerals and illustrated for explanation of each sensor.

Specifically, the tire side sensor 31 is embedded in the tire tread 21. The weight side sensor 32 is disposed in the counterweight 24 stuck on the rim 23. The wheel side sensor 33 is provided in the wheel 25, the tire inside sensor 34 is integrally attached to the valve (not shown), and the center cap-side sensor 35 is disposed on the back surface of the center cap 26.

The five sensors 31-35 shown in FIG. 2 are examples of the sensors 30 disposed in the wheel 20 shown in FIG. 1. However, the number of the sensors 30 or the arrangement locations of the sensors 30 are not limited to this embodiment.

The respective communication units 40 connected to the five sensors 30 respectively communicate with the body-side communication unit 200 disposed in the body 12, via the antennas 50 as in FIG. 1.

Next, an example of the wheel information outputted by the five sensors 30 respectively will be explained. Each sensor 30 may read the wheel information indicating the tire size which is stored in an ID tag embedded in the self sensor. The function of detection in this embodiment may include the operation to read the wheel information from the ID tag.

The tire side sensor 31 detects the impelling force of the tire based on the tire size, the kind of the tire, such as a summer tire, and the grounding load of the tire. The weight side sensor 32 detects the weight value of the counterweight, the kind of the material of the counterweight, such as lead or iron, and the placing method of the counterweight, such as an attachment method a sticking method.

The wheel side sensor 33 detects the wheel size, and the tire inside sensor 34 detects the air pressure and the temperature in the tire 22. The center cap-side sensor 35 detects whether a combination of wheel 25 and center cap 26 which are equipped is proper or not.

Figure 3:
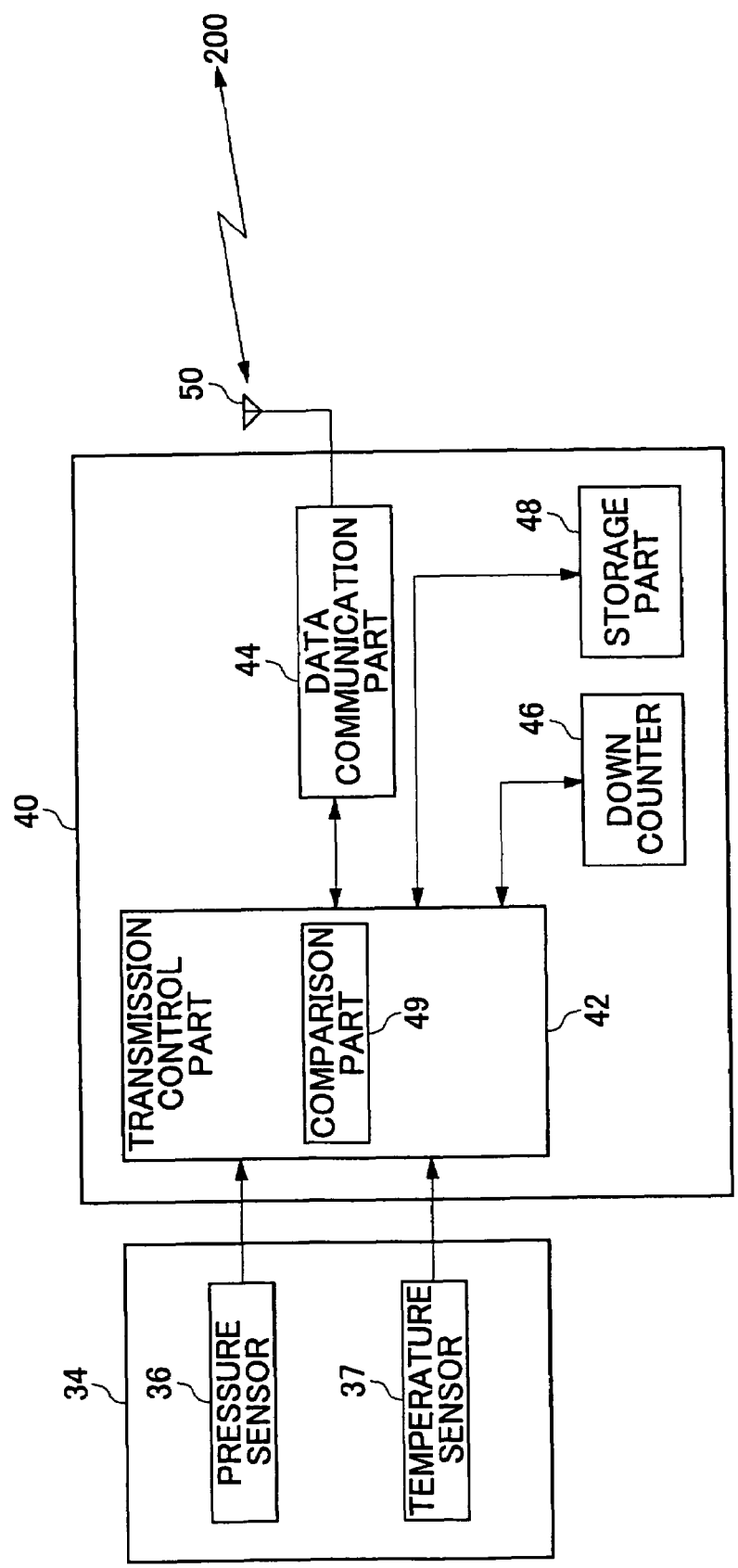
FIG. 3 is a block diagram showing the composition of the tire inside sensor and the communication unit in this embodiment.

FIG. 3 shows the composition of the tire inside sensor and the communication unit in this embodiment. In the embodiment of FIG. 3, the tire inside sensor 34 is shown as an example of the sensor 30 connected to the communication unit 40. Any of other sensors including the tire side sensors 31, the weight side sensor 32, wheel side sensor 33, and the center cap-side sensor 35 may be also connected to the communication unit 40.

The tire inside sensor 34 is provided with a pressure sensor 36 which detects the air pressure in the tire air chamber, and a temperature sensor 37 which detects the temperature in the tire air chamber.

In this embodiment, the tire inside sensor 34 includes the two sensors, and the two sensors function as a sensor group. The communication unit 40 is provided with a data communication part 44, a storage part 48, a down counter 46, and a transmission control part 42. The transmission control part 42 controls transmission of the wheel information by controlling the count value of the down counter 46. The data communication part 44 receives a request signal from the body-side communication unit 200 via the antenna 50, and transmits a reply signal to the body-side communication unit 200 in response to the request signal. The received request signal is temporarily stored in the storage part 48.

When the latest request signal is received, the request signal stored in the storage part 48 is updated by the latest request signal. Identification information (for example, identification number) which is specific to the communication unit 40 is stored in the storage part 48.

The transmission control part 42 is provided with a comparison part 49. The comparison part 49 compares the call signal included in the received latest request signal with the call signal included in the request signal previously stored in the storage part 48, and determines whether the received call signal is the same as the stored call signal. The details of the processing of the call signal will be mentioned later.

When it is determined by the comparison part 49 that the call signals are the same, the transmission control part 42 decrements the count value of the down counter 46 by one. When it is determined by the comparison part 49 that the received call signal is different from the previously stored call signal, the transmission control part 42 overwrites the necessity value of reply in the call signal corresponding to the identification number of the communication unit 40 included in the new call signal, to the down counter 46, and decrements the count value of the down counter 46 by one.

When the count value is equal to "0", the transmission control part 42 transmits a reply signal including the wheel information detected by the tire inside sensor 34, to the body-side communication unit 200.

On the other hand, when the count value is not equal to "0", the transmission control part 42 skips the processing of transmission of the wheel information.

FIG. 4 shows an example of the data structure of call signals included in a request signal to the wheel-side communication unit.

As shown in FIG. 4, the full length of the data codes of the call signals is set to 5 bytes, and the data codes concerned are constituted by five separate data blocks each consisting of one byte. Numerals #1 through #5 attached to the respective data blocks of FIG. 4 indicate the respective identification numbers of the communication units 40 connected to the five sensors 30 mentioned above.

Specifically, the numeral #1 indicates the identification number of the communication unit 40 connected to the tire side sensor 31, the numeral #2 indicates the identification number of the communication unit 40 connected to the weight side sensor 32, the numeral #3 indicates the identification number of the communication unit 40 connected to the wheel side sensor 33, the numeral #4 indicates the identification number of the communication unit 40 connected to the center cap-side sensor 35, and the numeral #5 indicates the identification number of the communication unit 40 connected to the tire inside sensor 34.

Shown in the inside of each of the data blocks in FIG. 4 is a necessity value of reply expressed in decimal-number form. The necessity value of reply is, for example, the information which indicates a probability of transmission of reply in response to the received request signal. Each piece of the information (necessity value of reply) is associated with the corresponding one of the identification numbers of the communication units 40.

In the above embodiment, the necessity value of reply for which the demand of reply to the request signal is high is set to a small number, and the necessity value of reply for which the demand of reply to the request signal is low is set to a large number.

For example, the necessity value "3" is associated with the numeral #1 in the example of FIG. 4. This means that, when the communication unit 40 connected to the tire side sensor 31 receives the request signal including the call signals shown in FIG. 4, the communication unit 40 transmits a reply signal to the body-side communication unit 200 with a probability of transmission of 1/3 (1 time for every 3 times).

On the other hand, the necessity value "5" is associated with the numeral #2 in the example of FIG. 4. This means that the communication unit 40 concerned transmits a reply signal to the body-side communication unit 200 with a probability of transmission of 1/5 (1 time for every 5 times). That is, the necessity value of reply for which the demand of reply to the request signal is high is set to a small number.

FIG. 5 shows an example of the call-signal table which is set up according to the running state of the vehicle in this embodiment.

As described above, the call-signal table 150 is retained in the ECU 64, and the call-signal table 150 concerned contains a running state column 152 and a call-signal column 154.

For example, when it is determined that the current running state of the vehicle is just after the ignition key is turned on, the ECU 64 generates a request signal including the call signals of "35551" indicated by data 156 in FIG. 5.

According to the call-signal table shown in FIG. 5, when the current running state of the vehicle is just after the ignition key is turned on, the necessity value of the call signal corresponding to the numeral #5 is set to "1" and the probability of transmission of reply is raised so that the wheel information concerning the air pressure and temperature of the tire can be acquired from the tire inside sensor 34 with a high frequency of transmission.

On the other hand, when the current running state of the vehicle is the cornering, the necessity value of the call signal corresponding to the numeral #1 is set to "1" and the probability of transmission of reply is raised so that the wheel information concerning the impelling force of the tire can be acquired from the tire side sensor 31 with a high frequency of transmission.

Therefore, the frequency of transmission of the transmitting signal of the wheel-side communication unit 40 can be changed according to the running state of the vehicle 10. As a result, the body-side communication unit 200 can acquire appropriately the necessary wheel information according to the running state of the vehicle 10.

Figure 6:
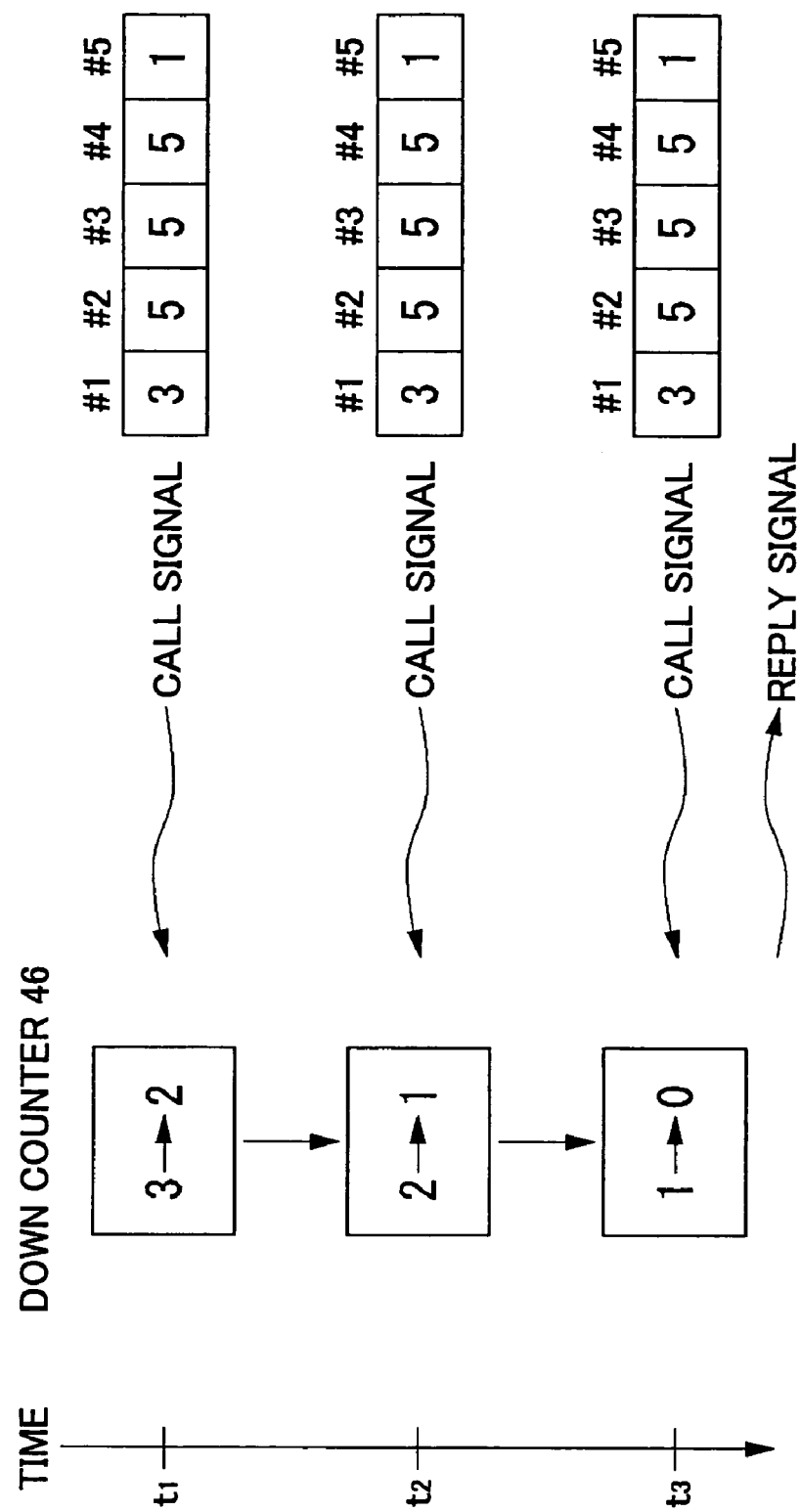
FIG. 6 is a diagram for explaining the procedure of transmitting a reply signal in this embodiment.

FIG. 6 shows an example of the procedure of transmitting a reply signal from the communication unit connected to the tire side sensor in this embodiment.

Suppose that, at time t1 which is just after the ignition key is turned on, the data communication part 44 receives the request signal including the call signals "35551". At this time, the transmission control part 42 of the communication unit 40 connected to the tire side sensor 31 extracts the information "3" corresponding to the numeral #1, and sets the count value in the down counter 46 to "3". Since the 1st reception has already been performed at this time, the count value is decremented to "2".

As shown in FIG. 6, at time t2, the request signal including the call signals which are the same as the previously received ones is received, and the transmission control part 42 decrements the count value in the down counter 46 to "1".

Also at time t3, the request signal including the call signals which are the same as the previously received ones is received, the same operation as that of time t2 is performed, and the count value is decremented to "0".

When the count value is equal to "0", the transmission control part 42 transmits a reply signal including the wheel information detected by the tire side sensor 31 to the body-side communication unit 200.

When it is determined by the comparison part 49 that the request signal including the call signals which are different from the previously received ones is received, the transmission control part 42 extracts the latest information (the necessity value of reply) corresponding to the numeral #1 from the received call signals, and updates the count value in the down counter 46 to the extracted necessity value of reply.

In the above-mentioned embodiment, when it is determined by the comparison part 49 that the request signal including the call signals which are different from the previously received ones is received, the update processing is continuously performed following the above-mentioned extracting processing, and when the count value is equal to "0", a reply signal is transmitted.

Alternatively, the above-mentioned embodiment may be configured so that, immediately when the request signal including the call signals which are different from the previously received ones is received, the transmission control part 42 transmits a reply signal including the wheel information to the body-side communication unit 200, and thereafter updates the count value, regardless of the count value at the time of the reception.

The time of a change of the call signals in the request signal transmitted from the body-side communication unit 200 corresponds to the time of a change of the running state of the vehicle. It is preferred that the ECU 64 acquires the necessary wheel information promptly as soon as the running state of the vehicle changes. Therefore, the transmission of a reply signal to the body-side communication unit 200 immediately when the request signal including the call signals different from the previously received ones is received, regardless of the count value at the time of the reception, is beneficial to attain safe running of the vehicle.

Figure 7:
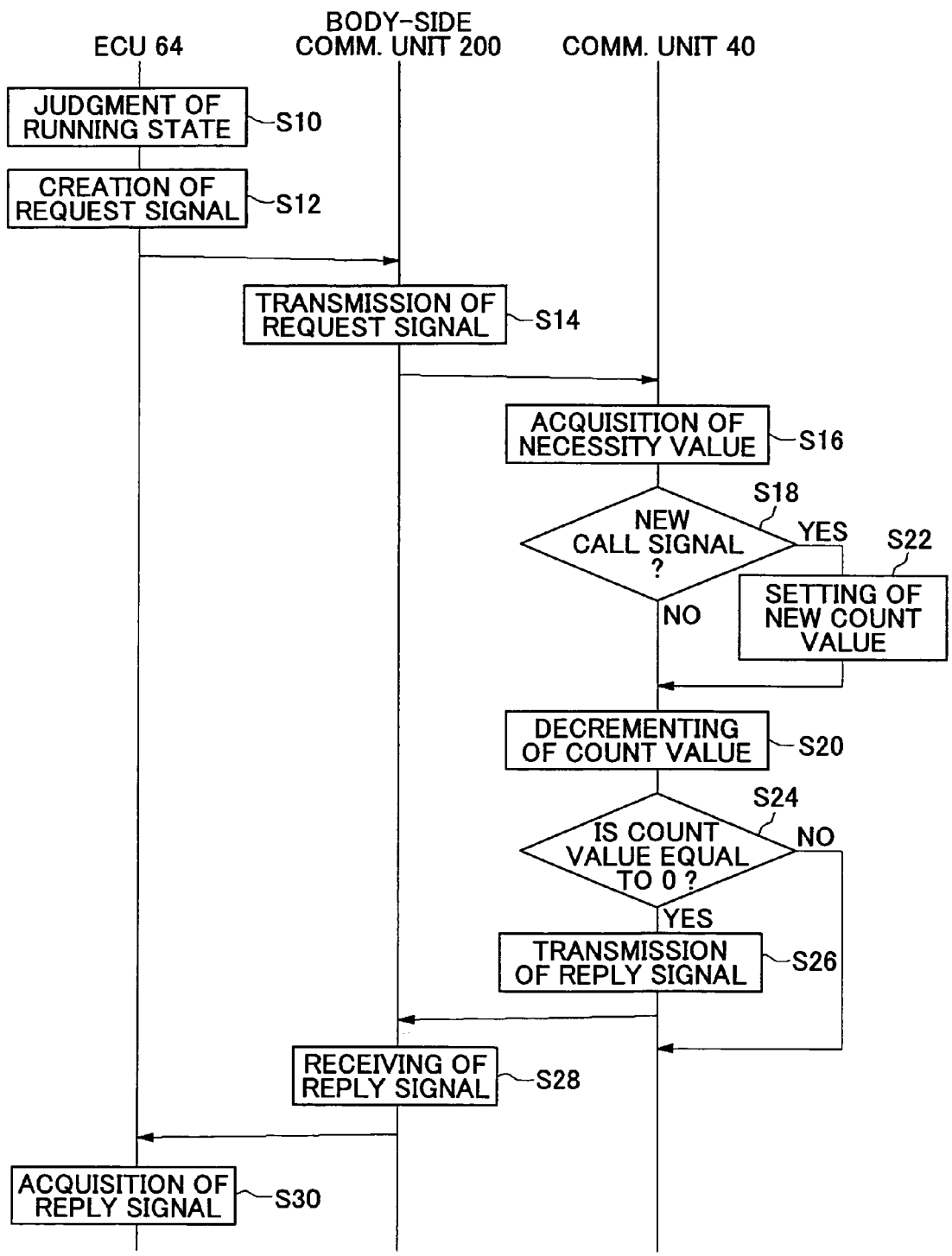
FIG. 7 is a diagram for explaining the procedure of communications of the wheel information in this embodiment.

FIG. 7 shows the procedure of communications of the wheel information performed by the wheel information processing device in this embodiment.

The communications procedure of FIG. 7 is repeatedly performed periodically or irregularly during a period of time between the instant the ignition key is turned on and the instant the ignition key is turned off.

As shown in FIG. 7, the ECU 64 determines the current running state of the vehicle 10 (S10). The ECU 64 makes reference to the call-signal table 150 based on the determined running state of the vehicle 10, and generates a request signal including the call signals which have the necessity value of reply corresponding to the current running state of the vehicle 10 (S12). The body-side communication unit 200 transmits the request signal to each of the plurality of communication units 40 (S14).

The communication unit 40 receives the request signal from the body-side communication unit 200, and acquires the necessity value of reply corresponding to the identification number of that communication unit 40 which is included in the received request signal (S16).

When the comparison part 49 determines that the request signal including the call signals which are the same as the previously received ones is received (No of S18), the transmission control part 42 sets the count value of the down counter 46 to the necessity value of reply and decrements the count value concerned by "1" (S20).

When the comparison part 49 determines that the request signal including the new call signals which are different from the previously received ones is received (Yes of S18), the transmission control part 42 overwrites the necessity value of reply corresponding to the identification number of the communication unit 40 concerned included in the new call signals to the down counter 46 (S22). And the transmission control part 42 decrements the count value of the down counter 46 by "1" (S20).

When the transmission control part 42 determines that the count value is equal to "0" (Yes of S24), the reply signal including the wheel information detected by the sensors 30 is transmitted through the communication unit 40 (S26).

The body-side communication unit 200 receives the reply signal from the communication unit 40 (S28). And the ECU 64 acquires the reply signal received by the body-side communication unit 200 (S30).

On the other hand, when the count value is not equal to "0" (No of S24), the transmit processing of the reply signal by the communication unit 40 is skipped.

According to the above-described embodiment, the ECU 64 generates the call signals including the necessity value of reply. The pattern of transmission of the signals transmitted by the plurality of communication units 40 (for example, the probability of transmission of a reply signal) is determined based on the necessity value of reply. As a result, the frequency of transmission of the transmitting signal for which the necessity of reply is high can be raised, so that the body-side communication unit 200 can acquire preferentially the necessary wheel information from the plurality of communication units 40.

In the above-described embodiment, the plurality of communication units are disposed at various locations, including the wheel and the tire tread, and the pattern of transmission of each of reply signals of the plurality of communication units is determined to be a different pattern based on the necessity of reply by the body-side communication unit.

A description will be given of another embodiment of the invention. In the following embodiment, the plurality of communication units are provided in a plurality of counterweights on the wheel, respectively, and the pattern of transmission of each of reply signals of the plurality of communication units is determined to a different pattern based on the weight of the counterweight concerned. The wheel information processing device of this embodiment is different from that of the previous embodiment of FIG. 2 in that the comparison part 49 and the down counter 46 are omitted from each communication unit 40 in the embodiment of FIG. 2, and the other composition of this embodiment is the same as that of the previous embodiment of FIG. 2.

Figure 8:
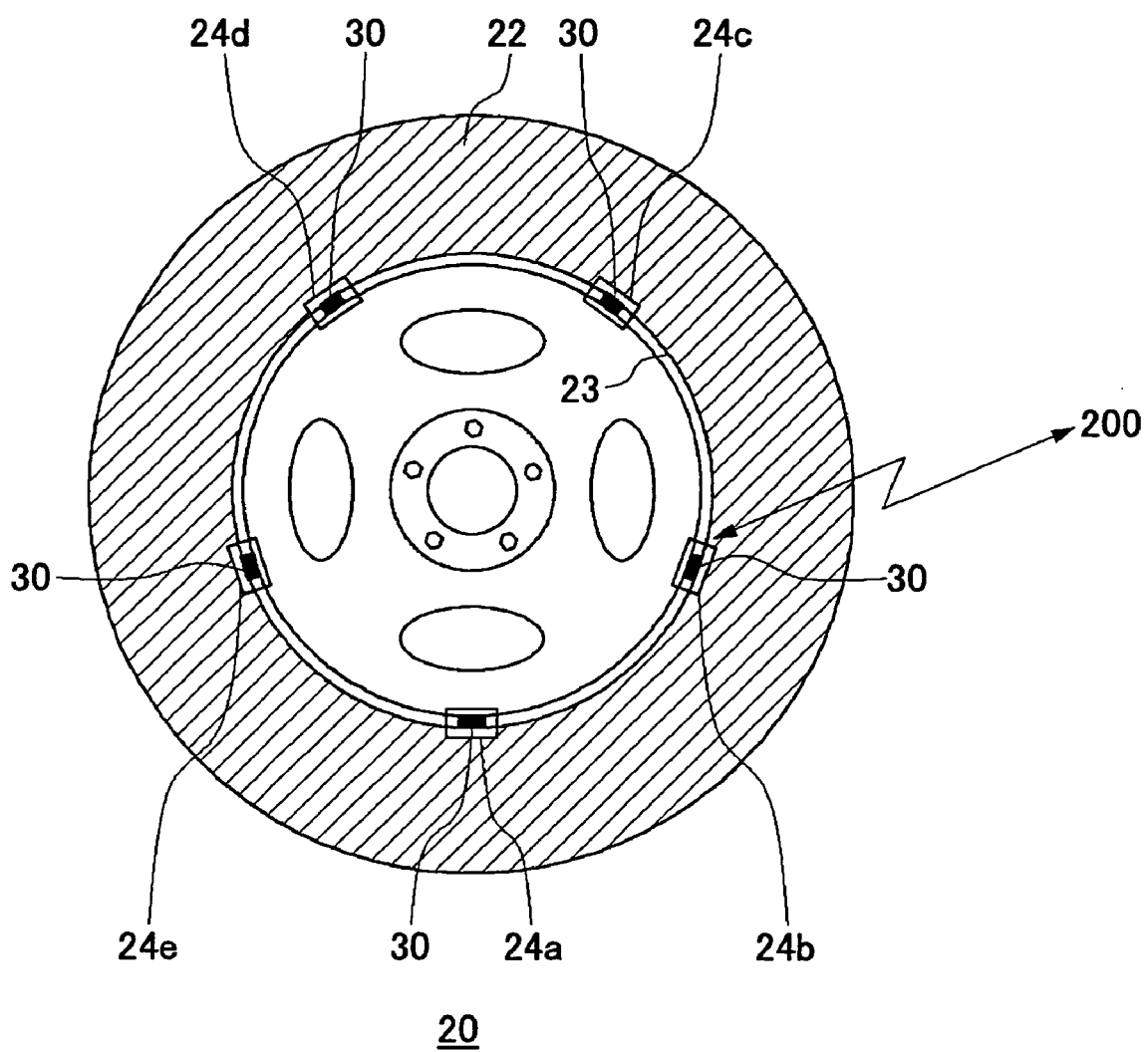
FIG. 8 is a diagram showing the outside appearance of the wheel in the automotive vehicle in which the wheel information processing device in another embodiment of the invention is provided.

FIG. 8 shows the outside appearance of the wheel in the automotive vehicle in which the wheel information processing device of this embodiment of the invention is provided.

In FIG. 8, the elements that are essentially the same as corresponding elements in FIG. 2 are designated by the same reference numerals, and a description thereof will be omitted.

As shown in FIG. 8, the rim 23 of the wheel is equipped with the five different counterweights: the 1st through 5th counterweights 24a-24e, and the sensor 30 is disposed at each of the 1st through 5th counterweights 24a-24e. Hereafter, the 1st through 5th counterweights 24a-24e will be collectively called the counterweights 24.

Actually, the communication unit 40 and the antenna 50 are connected to each of the five sensors 30, respectively. However, for the sake of simplicity of description, these elements are not illustrated in FIG. 8.

In the actual device, the weights of the five counterweights 24 may be the same, or may be different from each other. In this embodiment, suppose that the 1st-5th counterweights 24a-24e have the weights of 30 g, 20 g, 10 g, 5g and 5 g, respectively.

The body side communication unit 200 transmits a request signal to each of the plurality of sensors 30, and each of the sensors 30 receives the request signal from the body-side communication unit 200 and suitably transmits a reply signal to the body-side communication unit 200. In the embodiment of FIG. 8, the way the sensor 30 and the body-side communication unit 200 perform the radio communications therebetween is illustrated, for the sake of convenience of description. However, actually, the body-side communication unit 200 and the communication unit 40 provided in each of the counterweights 24 perform the radio communications therebetween.

In order to change the pattern of transmission of a reply signal in this embodiment, the delay time to a time of reception of the request signal from the body-side communication unit 200 is set up, for each of the plurality of communication units 40, according to the weight of the counterweight 24 concerned. Each communication unit 40 may have a delay time generation part (not shown) which performs the above-mentioned function.

In the present embodiment, the delay time for each communication unit 40 is set up so that the delay time for the communication unit 40 disposed in the counterweight 24 having a large weight is short. For example, a delay time T is set to the communication unit 40 disposed in the 1st counterweight 24a of the 30 g weight, and a twice longer delay time 2T is set to the communication unit 40 disposed in the 2nd counterweight 24b of the 20 g weight. In this case, the delay time T is set up as a reference delay time (T: unit time).

Alternatively, the delay time for each communication unit 40 is set up so that the delay time for the communication unit 40 disposed in the counterweight 24 having a small weight is short.

When there are the counterweights having the same weight, the delay time for each communication unit 40 is adjusted (increased or decreased) by a random time that is adequately small when compared with the delay time T concerned, so that the same delay time may not be set up. This random time may be generated by a random number generation part (not illustrated) which is provided in the communication unit 40 concerned.

FIG. 9A through FIG. 9C show the procedure in which the plurality of communication units transmit at different times reply signals in response to a request signal of the body-side communication unit.

As shown in FIG. 9A, the body-side communication unit 200 transmits a request signal 100 to each of the communication units 40 disposed in the 1st through 5th counterweights 24a-24e in time t0.

In this case, the body-side communication unit 200 does not transmit the request signal 100 to the selected one of the five communication units 40, but transmits the request signal 100 to each communication unit 40, and requests each communication unit 40 to transmit the detection values of the sensors.

Each communication unit 40 disposed in one of the 1st through 5th counterweights 24a-24e receives the request signal 100 of the body-side communication unit 200 in time t1.

As shown in FIG. 9B, the communication unit 40 disposed in the 1st counterweight 24a of 30 g sets up the send timing of the reply signal 102 to the timing that is delayed by a time T from the time t1 of reception of the request signal 100.

That is, the delay time for the communication unit 40 disposed in the 1st counterweight 24a is equal to the time T. On the other hand, as shown in FIG. 9C, the communication unit 40 disposed in the 4th counterweight 24d of 5 g sets up the send timing of the reply signal 104 to the timing that is delayed by a four-time longer time 4T from the time t1 of reception of the request signal 100, which follows the send timing of the reply signal 102 of the communication unit 40 disposed in the 1st counterweight 24a.

FIG. 10A through FIG. 10C show the procedure in which a random time is taken into consideration and the plurality of communication units transmit at different times reply signals.

As shown in FIG. 10A, the body-side communication unit 200 transmits the request signal 100 to the five sensors 30 in time t0.

As shown in FIG. 10B, the communication unit 40 disposed in the 4th counterweight 24d of 5 g sets up the send timing of the reply signal 106 to the timing which is delayed by a time (4T−dT1) from the time t1 of reception of the request signal 100. In this case, the time 4T is the delay time set up for each of the weights of the counterweights, and the time dT1 is a random time which is adequately small when compared with the reference delay time T (unit time).

On the other hand, as shown in FIG. 10C, the communication unit 40 disposed in the 5th counterweight 24e of 5 g (the same weight) sets up the send timing of the reply signal 108 to the timing that is delayed by a time (4T+dT2) from the time t1 of reception of the request signal 100. Thus, this timing is made different from the send timing of the reply signal 106 of the communication unit 40 disposed in the 4th counterweight 24d.

In the present embodiment, the send timing of each reply signal by the communication units 40 disposed in the 1st through 5th counterweights 24a-24e is made different by the gap of each delay time and does not overlap one another. It is possible to prevent the interference between the reply signals. Thereby, the body-side communication unit 200 can receive the necessary reply signal from the five communication units 40 exactly. There is a difference in the send timing (for example, the delay time T or the delay time 4T) of each of the reply signals of the communication units 40 disposed in the 1st through 5th counterweights 24a-24e. The reply signal of the communication unit 40 disposed in each of the 1st through 5th counterweights 24a-24e is distinguishable. The ECU 64 can specify which communication unit 40 has transmitted the reply signal concerned is attached to the counterweight 24 of which the weight from the delay time of the reply signal of the communication unit 40 by making time to adjust at the delay time minute compared with the delay time concerned.

The counterweights 24 may fall by the vertical vibrations of the wheel during running of the vehicle on a bad road. According to the present embodiment, the ECU 64 can detect a fall of the counterweight 24 at an early stage by forming the body-side communication unit 200 connected to the ECU 64 and the communication unit 40 which performs the radio communications periodically or irregularly in the counterweight 24.

In this case, the ECU 64 may tell a driver about counterweight 24 having fallen by making warning lamp 72 turn on or making buzzer 70 sound beeping.

When discarding counterweight 24 at a factory, the worker may need to perform special discarding treatment according to the quality of the material of counterweight 24. In this case, for the sake of appearance, the worker may be unable to specify the quality of the material of counterweight 24.

According to the present embodiment, a worker is acquiring the information about the quality of the material of the counterweight 24 from the communication unit 40 disposed in the counterweight 24, and can specify easily the quality of the material of the counterweight 24.

It is significant that this forms communication unit 40 in counterweight 24. The worker may need to grasp the weight of the counterweight 24 provided in the wheel 20 at the time of check of wheel balance.

In this case, a worker is acquiring the information about the weight of the counterweight 24 from the communication unit 40 disposed in counterweight 24, and can specify the weight of the counterweight 24 easily. It is significant that this forms communication unit 40 in counterweight 24.

Although the wheel information processing device of the above-mentioned embodiment was changing the pattern of transmission according to the weight of the counterweight, the communication unit of this embodiment changes a pattern of transmission by transmitting a reply signal, when the same weight information as self weight information is included in the received request signal.

The composition of the wheel information processing device in this embodiment is the same as the composition of the wheel information processing device in the previous embodiment.

FIG. 11A through FIG. 11D show the procedure which changes send timing and transmits a reply signal to the request signal of the body-side communication unit.

As shown in FIG. 11A, the body-side communication unit 200 transmits the request signal which includes weight information in communication unit 40 disposed in the 1st through 5th counterweights 24a-24e one by one.

The body side communication unit 200 whose weight information is the information indicating the weight of the counterweight, such as 30 g, 20 g etc., and which is applied to this embodiment shall transmit in an order from a request signal including the weight information of the large weight.

Specifically, the request signal 100a with which the body-side communication unit 200 includes the weight information which indicates the weight of 30 g at time t0 as shown in FIG. 11A, the request signal 100c including the weight information which indicates the weight of 10 g is transmitted to request signal 100b including the weight information which indicates the weight of 20 g at time t2, and time t4.

The body side communication unit 200 chooses either of the five communication units 40, and does not transmit request signal 100, but transmits request signal 100 to every communication unit 40, and requires transmission of the detection value of a sensor.

The communication unit 40 disposed in one of the 1st through 5th counterweights 24a-24e receives the request signal which includes 30 g of weight information at time t1. In this case, since the communication unit 40 disposed in 30 g of the 1st counterweight 24*a* has the same weight information as the weight information within a request signal, as shown in FIG. 11B, reply signal 110 is transmitted to time t1.

Since the communication unit 40 disposed in the counterweight 24 other than 30 g at this time has different weight information from the weight information within the request signal received at time t1, it skips transmission of a reply signal.

Similarly, the communication unit 40 with which reply signal 112 was disposed in communication unit 40 disposed in 20 g of the 2nd counterweight 24*b* by 10 g of the 3rd counterweight 24*c* at time t5 transmits reply signal 114 to time t3.

In the present embodiment, the communication unit 40 which was disposed in the 1st through 5th counterweights 24*a*-24*e*, the interference can be controlled by shifting the send timing of each reply signal. Thereby, the body-side communication unit 200 can receive the reply signal of five communication units 40 needed exactly.

As for the ECU 64, the counterweight 24 of which weight can grasp periodically or irregularly how many it exists by communicating in order the signal which includes weight information between communication unit 40 and body-side communication unit 200 in order of weight. In this case, when the ECU 64 totals and detects the absence of counterweight 24 beyond the fixed Weight value, a driver may be told about the absence of counterweight 24 beyond the fixed Weight value by making warning lamp 72 turn on or making buzzer 70 sound beeping.

In the previous embodiment of FIG. 8, the pattern of transmission of each of the reply signals is determined to a different patter based on the weight of the counterweight concerned.

A description will be given of another embodiment of the invention. In the following embodiment, the pattern of transmission of each reply signal is determined to a different pattern based on the arrangement location of the communication unit concerned which is an element which determines a communication performance of the communication unit concerned.

The wheel information processing device of this embodiment has the composition that is essentially the same as that of the wheel information processing device of the previous embodiment of FIG. 8, and a description thereof will be omitted.

Figure 12:
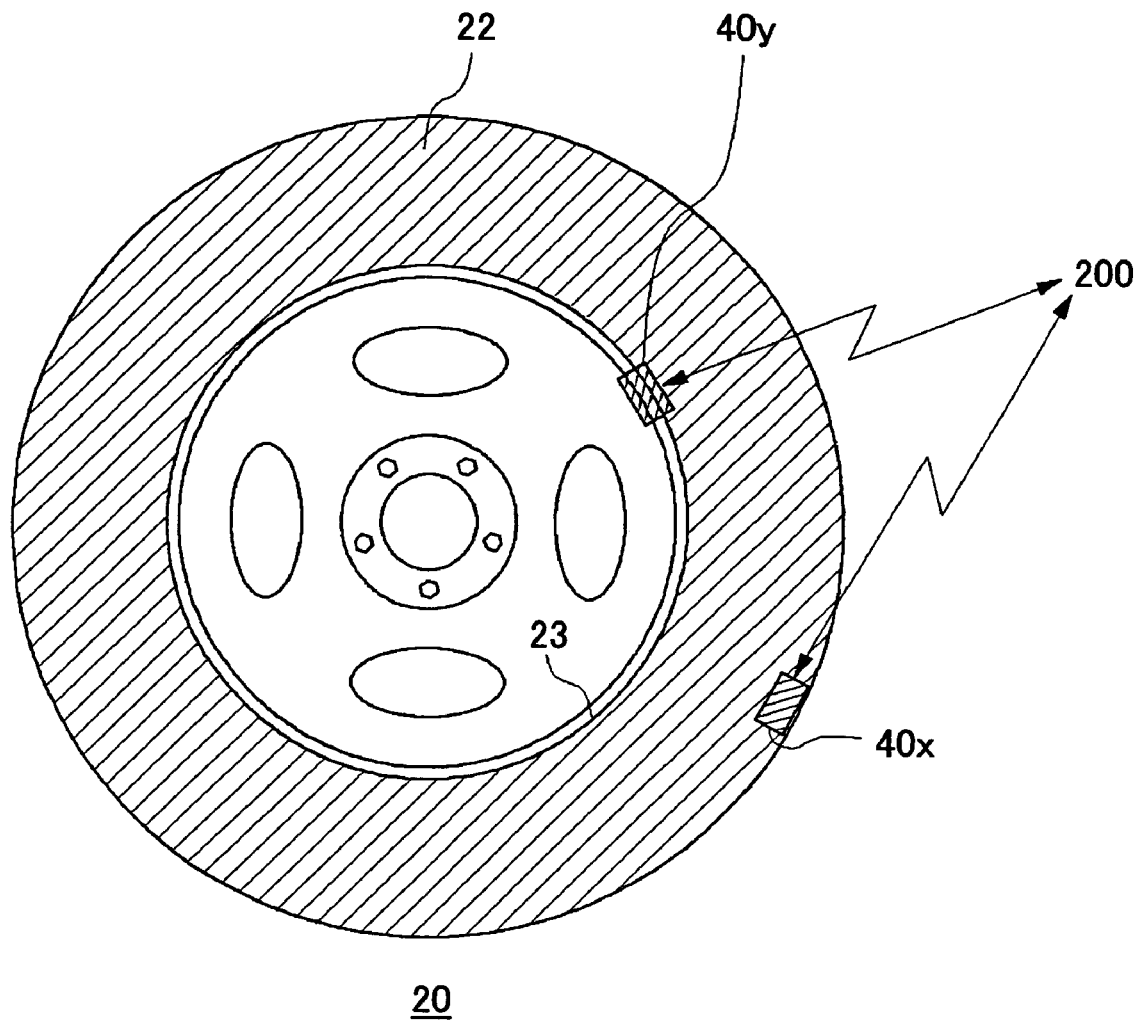
FIG. 12 is a diagram showing the outside appearance of the wheel of the automotive vehicle in which the wheel information processing device in another embodiment of the invention is provided.

FIG. 12 shows the outside appearance of the wheel 20 in this embodiment. As shown in FIG. 12, the 1st communication unit 40*x* is disposed on the tire tread which corresponds to the outer periphery of the tire 22, and the 2nd communication unit 40*y* is disposed on the rim 23 of the wheel 20.

In the previous embodiment of FIG. 8, the wheel information on the sensor 30 which transmits a reply signal is taken into consideration, and the sensor 30 is illustrated. However, in the present embodiment, the arrangement location of the communication unit 40 is taken into consideration, and the communication unit 40 is illustrated.

In the present embodiment, the sensor 30 and the antenna 50 are connected to each of the plurality of communication units 40. This is the same as in the previous embodiment of FIG. 8.

The body side communication unit 200 transmits a request signal to each of the 1st communication unit 40*x* and the 2nd communication unit 40*y*, and each of these communication units 40 receives the request signal from the body-side communication unit 200, and suitably transmits a reply signal to the body-side communication unit 200 in response.

As shown in FIG. 12, the 2nd communication unit 40*y* is arranged in the position that is nearer to the revolving shaft of the wheel 20 than the arrangement location of the 1st communication unit 40*x*.

A change of the distance between the body-side communication unit 200 and the communication unit 40 which is located apart from the wheel revolving shaft which is the center of rotation of the wheel 20 becomes large. The communication of such communication unit 20 is not stabilized and the body-side communication unit 200 may fail to receive the reply signal or may receive erroneous information of the reply signal.

To obviate the problem, it is significant to set up the frequency of transmission of a reply signal of the 1st communication unit 40*x* to be higher than the frequency of transmission of a reply signal of the 2nd communication unit 40*y*.

In the present embodiment, the frequency of transmission of each of the reply signals of the plurality of wheel-side communication units 40 (or the pattern of transmission of each reply signal) is determined to a different pattern based on the arrangement location of the communication unit concerned. Therefore, the body-side communication unit 200 can acquire exactly the necessary wheel information from the plurality of wheel-side communication units 40.

The present invention is not limited to the above-described embodiments, and variations and modifications may be made without departing from the scope of the present invention.

For example, each of the plurality of wheel-side communication unit 40 may be a battery-driven type communication unit having a battery, or a transponder to which source power is supplied by an electric wave sent from the body-side communication unit 200.

The necessity value of reply included in each of the call signals of a request signal is set up gradually in the previous embodiment of FIG. 2. Alternatively, it may be set up in the form of binary "1" or "0". In this case, the binary "1" means that the probability of transmission of a reply signal is 100%, and, on the other hand, the binary "0" means that the transmission of a reply signal is skipped.

That is, when the wheel-side communication unit 40 receives "1", the transmission control part 42 always transmits the reply signal including the wheel information, to the body-side communication unit 200. On the other hand, when the wheel-side communication unit 40 receives "0", the transmission control part 42 skips the transmission of the reply signal to the body-side communication unit 200. Thus, the body-side communication unit 200 can acquire preferentially the necessary wheel information from the plurality of wheel-side communication units by changing the pattern of transmission of each of the reply signals of the plurality of wheel-side communication units 40 based on the necessity of reply.

In the previous embodiment of FIG. 2, the wheel-side communication unit 40 transmits the reply signal when the necessity value of reply acquired from the body-side communication unit 200 is decreased gradually and reaches "0". Alternatively, the transmission of a reply signal may be performed with a probability of transmission according to the acquired necessity value of reply. For example, when "5" is acquired as the necessity value of reply, the communication unit 40 generates a random number by using the random number generating part (not shown) provided in the communication unit 40 concerned, and transmits a reply signal with a probability of transmission of one fifth (1/5).

In the previous embodiment of FIG. 2, the call-signal table 150 is provided in the ECU 64. Alternatively, the call-signal table 150 may be provided in the wheel-side communication unit 40 instead of in the ECU 64. In this case, the communication unit 40 may acquire the information about the running state of the vehicle from the body-side communication unit 200 by radio communications, and may specify the necessity of the reply corresponding to the current running state of the vehicle by referring to the call-signal table 150 provided in the self communication unit. Thereby, the time and effort for which the ECU 64 generates call signals including the necessity value of reply can be eliminated.

In the previous embodiment of FIG. 2, the necessity value of reply is included in the call signals of the request signal. Alternatively, the frequency of transmission may be included in the call signals of the request signal, instead of the necessity value of reply.

Specifically, when "3" is stored in the data block of a call signal, the communication unit 40 may transmit a reply signal 3 times per minute, for example. In this case, the frequency of transmission becomes high when the necessity of reply is high, and on the other hand, the frequency of transmission becomes low when the necessity of reply is low.

Thus, the body-side communication unit 200 can acquire preferentially the necessary wheel information from the plurality of wheel-side communication units by changing the pattern of transmission of each of the reply signals of the plurality of communication units 40 according to the frequency of transmission.

What is claimed is:

1. A wheel information processing device comprising:
   a plurality of wheel-side communication units provided in a wheel of an automotive vehicle; and
   a body-side communication unit provided in a body of the vehicle to communicate with the plurality of wheel-side communication units,
   wherein a pattern of transmission of signals transmitted by each of the plurality of wheel-side communication units is determined based on a characteristic of each wheel-side communication unit respectively.

2. The wheel information processing device according to claim 1 wherein the pattern of transmission of the signals transmitted by each of the plurality of wheel-side communication units is determined based on either an element that determines a necessity of transmission of a signal transmitted by each wheel-side communication unit respectively, or an element that determines a communication performance of each wheel-side communication unit respectively.

3. The wheel information processing device according to claim 2 further comprising a wheel information detecting part provided to detect wheel information of the wheel,
   wherein the element that determines the necessity of transmission a content of the wheel information detected by the wheel information detecting part.

4. The wheel information processing device according to claim 1 further comprising a vehicle running state acquisition module provided to acquire a running state of the vehicle.
   wherein the pattern of transmission of the signals transmitted by each of the plurality of wheel-side communication units is determined so that the determined pattern of transmission varies according to a change of the running state of the vehicle acquired by the vehicle running state acquisition part.

5. The wheel information processing device according to claim 1 wherein a frequency of transmission per a predetermined unit time is determined and thereby the pattern of transmission of the signals transmitted by each of the plurality of wheel-side communication units is determined.

6. The wheel information processing device according to claim 1 wherein a probability of transmission is determined and thereby the pattern of transmission of the signals transmitted by each of the plurality of wheel-side communication units is determined.

7. The wheel information processing device according to claim 1 wherein the plurality of wheel-side communication units have respective identification numbers that are distinctly separate, each of the plurality of wheel-side communication units receiving a request signal from the body-side communication unit, and the request signal containing a necessity value of reply associated with an identification number of each of the wheel-side communication units, and
   wherein the pattern of transmission of the signals transmitted by each of the plurality of wheel-side communication units is determined based on the necessity value of reply corresponding to the respective identification number of each of the wheel-side communication units contained in the received request signal.

8. The wheel information processing device according to claim 1 wherein the plurality of wheel-side communication units are provided in a plurality of counterweights respectively, and the pattern of transmission of the signals transmitted by each of the plurality of wheel-side communication units is determined based on a weight of a counterweight of the wheel-side communication unit concerned.

9. The wheel information processing device according to claim 8 wherein a delay time to a time of reception of a request signal of the body-side communication unit is set up for each of the plurality of wheel-side communication units according to the weight of the counterweight of each of the wheel-side communication units, and
   wherein the pattern of transmission of the signals transmitted by each of the plurality of wheel-side communication units is determined by increasing or decreasing the delay time by a random time that is adequately small compared to the delay time.

10. The wheel information processing device according to claim 1 wherein each of the plurality of wheel-side communication units are provided with a counterweight and have weight information indicating a weight of the counterweight,
    the body-side communication unit is provided to transmit a request signal including the weight information to the plurality of wheel-side communication units serially, and
    each of the plurality of wheel-side communication units is provided to transmit a signal to the body-side communication unit when the weight information included in the request signal received is the same as the weight information of the wheel-side communication unit.

11. The wheel information processing device according to claim 2 wherein the element that determines the communication performance of each wheel-side communication unit is an arrangement location of each wheel-side communication unit.

12. The wheel information processing device according to claim 11 wherein the pattern of transmission of the signals transmitted by each of the plurality of wheel-side communication units is determined such that a frequency of transmission per a predetermined unit time is made higher for a longer distance of the arrangement location of the wheel-side communication unit from a revolving shaft of the wheel.

* * * * *